US007373642B2

(12) United States Patent
Williams et al.

(10) Patent No.: US 7,373,642 B2
(45) Date of Patent: May 13, 2008

(54) DEFINING INSTRUCTION EXTENSIONS IN A STANDARD PROGRAMMING LANGUAGE

(75) Inventors: Kenneth M Williams, San Jose, CA (US); Albert Wang, Los Altos, CA (US)

(73) Assignee: Stretch, Inc., Sunnyvale, CA (US)

( * ) Notice: Subject to any disclaimer, the term of this patent is extended or adjusted under 35 U.S.C. 154(b) by 638 days.

(21) Appl. No.: 10/630,542

(22) Filed: Jul. 29, 2003

(65) Prior Publication Data
US 2005/0027971 A1  Feb. 3, 2005

(51) Int. Cl.
G06F 9/44 (2006.01)

(52) U.S. Cl. .................. 717/160; 717/146; 717/150; 717/159

(58) Field of Classification Search ............... 717/159
See application file for complete search history.

(56) References Cited

U.S. PATENT DOCUMENTS

| | | |
|---|---|---|
| 4,635,261 A | 1/1987 | Anderson et al. |
| 4,766,569 A | 8/1988 | Turner et al. |
| 4,893,311 A | 1/1990 | Hunter et al. |
| 5,055,997 A | 10/1991 | Sluijter et al. |
| 5,247,689 A | 9/1993 | Ewert |
| 5,258,668 A | 11/1993 | Cliff et al. |
| 5,260,610 A | 11/1993 | Pedersen et al. |
| 5,260,611 A | 11/1993 | Cliff et al. |
| 5,274,581 A | 12/1993 | Cliff et al. |
| 5,274,782 A | 12/1993 | Chalasani et al. |
| 5,293,489 A | 3/1994 | Furui et al. |
| 5,299,317 A | 3/1994 | Chen et al. |
| 5,343,406 A | 8/1994 | Freeman et al. |
| 5,357,152 A | 10/1994 | Jennings, III |
| 5,361,373 A | 11/1994 | Gilson |

(Continued)

FOREIGN PATENT DOCUMENTS

EP   0 507 507   7/1992

(Continued)

OTHER PUBLICATIONS

Beeck et al., "Crisp: A Template for Reconfigurable Instruction Set Processors," FPL 2001, LNCS 2147, pp. 296-305, Springer-Verlag Berlin Heidelberg, 2001.
Bechade, R.A. et al., "Programmable Arithmetic/Logic Circuits," IBM Technical Disclosure Bulletin, U.S. IBM Corp., New York, vol. 3, No. 11, Apr. 1981, pp. 4870-4873, XP-000713711.

(Continued)

Primary Examiner—Tuan Dam
Assistant Examiner—Isaac T Tecklu
(74) Attorney, Agent, or Firm—Carr & Ferrell LLP

(57) ABSTRACT

A method is provided for modifying a program written in a standard programming language so that when the program is compiled both an executable file is produced and an instruction is programmed into a programmable logic device of a processor system. The method includes identifying a critical code segment of a program, rewriting the critical code segment as a function, revising the program, and compiling the program. Revising the program includes designating the function as code to be compiled by an extension compiler and replacing the critical code segment of the program with a statement that calls the function. Compiling the program includes compiling the code with an extension compiler to produce a header file and the instruction for the programmable logic device. Compiling the program also includes using a standard compiler to compile the remainder of the program together with the header file to generate the executable file.

49 Claims, 7 Drawing Sheets

U.S. PATENT DOCUMENTS

| | | | |
|---|---|---|---|
| 5,414,377 A | 5/1995 | Freidin | |
| 5,426,378 A | 6/1995 | Ong | |
| 5,436,574 A | 7/1995 | Veenstra | |
| 5,471,628 A | 11/1995 | Phillips et al. | |
| 5,488,612 A | 1/1996 | Heybruck | |
| 5,517,627 A | 5/1996 | Petersen | |
| 5,535,406 A | 7/1996 | Kolchinsky | |
| 5,619,665 A | 4/1997 | Emma | |
| 5,636,224 A | 6/1997 | Voith et al. | |
| 5,652,875 A | 7/1997 | Taylor | |
| 5,682,493 A | 10/1997 | Yung et al. | |
| 5,684,980 A | 11/1997 | Casselman | |
| 5,696,956 A | 12/1997 | Razdan et al. | |
| 5,726,584 A | 3/1998 | Freidin | |
| 5,742,180 A | 4/1998 | DeHon et al. | |
| 5,784,636 A | 7/1998 | Rupp | |
| 5,819,064 A | 10/1998 | Razdan et al. | |
| 5,822,588 A * | 10/1998 | Sterling et al. | 717/131 |
| 5,847,578 A | 12/1998 | Noakes et al. | |
| 5,850,564 A | 12/1998 | Ting et al. | |
| 5,920,202 A | 7/1999 | Young et al. | |
| 5,926,036 A | 7/1999 | Cliff et al. | |
| 5,956,518 A | 9/1999 | DeHon et al. | |
| 5,963,050 A | 10/1999 | Young et al. | |
| 5,977,793 A | 11/1999 | Reddy et al. | |
| 5,982,195 A | 11/1999 | Cliff et al. | |
| 5,986,465 A | 11/1999 | Mendel | |
| 5,999,734 A | 12/1999 | Willis et al. | |
| 6,092,174 A | 7/2000 | Roussakov | |
| 6,167,502 A | 12/2000 | Pechanek et al. | |
| 6,219,628 B1 | 4/2001 | Kodosky et al. | |
| 6,237,079 B1 | 5/2001 | Stoney | |
| 6,292,388 B1 | 9/2001 | Camarota | |
| 6,343,337 B1 | 1/2002 | Dubey et al. | |
| 6,353,841 B1 | 3/2002 | Marshall et al. | |
| 6,374,403 B1 | 4/2002 | Darte et al. | |
| 6,415,424 B1 | 7/2002 | Arimilli et al. | |
| 6,418,045 B2 | 7/2002 | Camarota | |
| 6,426,648 B1 | 7/2002 | Rupp | |
| 6,557,092 B1 | 4/2003 | Callen | |
| 6,622,233 B1 | 9/2003 | Gilson | |
| 6,633,181 B1 | 10/2003 | Rupp | |
| 6,698,015 B1 * | 2/2004 | Moberg et al. | 717/154 |
| 6,721,884 B1 | 4/2004 | De Oliveira Kastrup Pereira et al. | |
| 6,732,354 B2 | 5/2004 | Ebeling et al. | |
| 6,744,274 B1 | 6/2004 | Arnold et al. | |
| 6,795,900 B1 | 9/2004 | Miller et al. | |
| 6,799,236 B1 * | 9/2004 | Dice et al. | 710/200 |
| 6,817,013 B2 * | 11/2004 | Tabata et al. | 717/151 |
| 6,831,690 B1 | 12/2004 | John et al. | |
| 6,857,110 B1 | 2/2005 | Rupp et al. | |
| 6,874,110 B1 | 3/2005 | Camarota | |
| 6,883,084 B1 | 4/2005 | Donohoe | |
| 6,954,845 B2 | 10/2005 | Arnold et al. | |
| 6,968,544 B1 * | 11/2005 | Schneider | 717/146 |
| 6,996,709 B2 | 2/2006 | Arnold et al. | |
| 7,000,211 B2 | 2/2006 | Arnold | |
| 7,062,520 B2 | 6/2006 | Rupp | |
| 7,086,047 B1 | 8/2006 | Edwards et al. | |
| 7,178,062 B1 * | 2/2007 | Dice | 714/38 |
| 2001/0049816 A1 | 12/2001 | Rupp | |
| 2003/0046513 A1 | 3/2003 | Furuta et al. | |
| 2003/0097546 A1 | 5/2003 | Taylor | |
| 2003/0108119 A1 | 6/2003 | Mohebbi et al. | |
| 2003/0196058 A1 | 10/2003 | Ramagopal et al. | |
| 2004/0019765 A1 | 1/2004 | Klein, Jr. | |
| 2004/0186872 A1 | 9/2004 | Rupp | |
| 2005/0027970 A1 | 2/2005 | Arnold et al. | |
| 2005/0166038 A1 | 7/2005 | Wang et al. | |
| 2005/0268271 A1 | 12/2005 | Gutberlet et al. | |

FOREIGN PATENT DOCUMENTS

| | | |
|---|---|---|
| EP | 0 668 659 | 8/1995 |
| EP | 1 443 417 | 8/2004 |
| TW | 478252 | 3/2002 |
| TW | 480818 | 3/2002 |
| TW | 509798 | 11/2002 |

OTHER PUBLICATIONS

U.S. Appl. No. 10/404,706, Scott D. Johnson, Extension Adapter, filed Mar. 31, 2003.

U.S. Appl. No. 10/686,882, Kenneth Williams, Instruction Set for Efficient Bit Stream and Byte Stream I/O, filed Oct. 15, 2003.

U.S. Appl. No. 10/750,714, Ricardo Gonzalez, Systems and Methods for Software Extensible Multi-Processing, filed Dec. 31, 2003.

U.S. Appl. No. 10/815,453, Ricardo Gonzalez, Configuring a Multi-Processor System, filed Mar. 31, 2004.

U.S. Appl. No. 11/021,247, Ricardo Gonzalez, Systems and Methods for Selecting Input/Output Configuration in an Integrated Circuit, filed Dec. 21, 2004.

U.S. Appl. No. 11/129,146, Ricardo Gonzalez, Long Instruction Word Processing with Instruction Extensions, filed May 12, 2005.

U.S. Appl. No. 11/099,280, Jeffrey M. Arnold, Video Processing System with Reconfigurable Instructions, filed Apr. 4, 2005.

U.S. Appl. No. 11/204,555, Jeffrey M. Arnold, Programmable Logic Configuration for Instruction Extensions, filed Aug. 15, 2005.

Borkar et al., "iWarp: An Integrated Solution to High-Speed Parallel Computing, " 1988, IEEE CH2617-9/88/0000/03300.

Barat, Francisco and Rudy Lauwereins, "Reconfigurable Instruction Set Processors: A Survey," 2000, IEEE 0-7695-0668-2/00.

Dehon, Andre, "Transit Note #118 Notes on Coupling Processors with Reconfigurable Logic," M.I.T. Transit Project, Last Updated March 21, 1995.

Tanenbaum, Andrews S., "Modern Operating Systems," 2001, 2nd edition, Prentice Hall, New Jersey, p. 31.

Hennessy, John L. and David A. Patterson, "Computer Organization and Design: The Hardware/Software Interface," 1998, 2nd edition, Morgan Kaufmann Publishers, Inc., San Francisco, CA, p. 345.

Lee, K.C., "A Virtual Bus Architecture for Dynamic Parallel Processing," Feb. 1993, IEEE Transaction on Parallel and Undistributed Systems, vol. 4, No. 2, pp. 121-130.

Goldblatt, Kim, "The Low-Cost, Efficient Serial Configuration of Spartan FPGAs," Nov. 13, 1998, XAPP098 (Version 1.0), XILINX.

Scott, Steven L. and Gregory M. Thorson, "The Cray T3E Network: Adaptive Routing in a High Performance 3D Torus," Aug. 15-16, 1996, HOT Interconnects IV, Stanford University.

Golestani, S. Jamaloddin, "A Sto-and-Go Queuing Framework for Congestion Management," 1990,Proc. of the ACM Symposium on Communications Architectures & Protocols, ACM Press, New York, NY, pp. 8-18.

Dally, William J. and Charles L. Seitz, "Deadlock Free Message Routing In Multiprocessor Interconnection Networks," May 10, 1985, Computer Science Department, California Institute of Technology.

Garlan, David and Mary Shaw, "An Introduction to Software Architecture," Jan. 1994, CMU-CS-94-166, School of Computer Science, Carnegie Mellon University, Pittsburgh, PA.

Intel and Hewlett-Packard, "IA-64 Application Instruction Set Architecture Guide," Revision 1.0, 1999, pp. C-1 through C.

Hwang, Kai, "Advanced Computer Architecture: Parallelism, Scalability, Programmability," 1993, McGraw Hill, pp. 182-183.

Ye, Z.A. et al., "Chimaera: a high-performance architecture with a tightly-coupled reconfigurable functional unit," Jun. 10-14, 2000, Proc. of the 27th International Symposium on Computer Architecture, pp. 225-235.

MIPS Technologies Inc., "MIPS Extension for Digital Media with 3D," 1996, pp. 1-26.

Borgatti, Michele et al., "A Reconfigurable System featuring Dynamically Extensible Embedded Microprocessor, FPGA and Customisable I/O," 2002, IEEE Custom Integrated Circuits Conference, pp. 1-4.

Razdan, Rahul and Michael D. Smith, "A High-Performance Microarchitecture with Hardware-Programmable Functional Units," Nov. 1994, Proc. of MICRO-27, pp. 1-9.

Pedro Diniz, et al. "Automatic Synthesis of Data Storage and Control Structures for FPGA-based Computing Engines," 2000 IEEE, pp. 91-100.

Michael Bedford Taylor et al., "The Raw Microprocessor: A Computational Fabric for Software Circuits and General-Purpose Programs," Mar.-Apr. 2002, IEEE Micro, pp. 25-35.

Elliot Waingold et al., "Baring It All to Software: Raw Machines," Computer, Sep. 1997, 1997 IEEE, pp. 86-93.

U.S. Appl. No. 10/746,018, filed Dec. 23, 2003, Rupp et al.

Kai Hwang, "Advanced Computer Architecture: Parallelism, Scalability, Programmability," 1st Edition, Chapter 2, pp. 75-97, copyright 1993, McGraw-Hill, Inc., USA.

* cited by examiner

DEFINING INSTRUCTION EXTENSIONS IN A STANDARD PROGRAMMING LANGUAGE

CROSS-REFERENCE TO RELATED APPLICATIONS

The subject matter of this application is related to U.S. application Ser. No. 10/404,706 filed on Mar. 31, 2003 and titled "Extension Adapter" which is incorporated herein by reference.

BACKGROUND OF THE INVENTION

1. Field of the Invention

The present invention relates generally to the field of programmable computer processors, and more particularly to application specific instruction sets.

2. Description of the Prior Art

Computer processors can generally be sorted into two classes: general purpose processors that can be adapted to a multitude of applications; and application-specific processors that are optimized to serve specific applications. General purpose processors are designed to run a general instruction set, namely a set of instructions that the processor will recognize and execute. Such general instruction sets tend to include a large number of instructions in order to support a wide variety of programs. Application-specific processors are designed to run a more limited instruction set, where the instructions are more tailored or specific to the particular application. While an application-specific processor can enable certain programs to execute much faster than when run on a general purpose processor, they are by definition more limited in functionality due to the limited instruction sets they run. Further, instructions for an application-specific processor must be defined before the processor is manufactured.

Accordingly, what is desired is the ability to write a program in a convenient programming language and to extend an instruction set of a computer processor with instructions tailored to that program so that the program can execute on that computer processor more efficiently.

BRIEF SUMMARY OF THE INVENTION

As general-purpose processors typically do not have programmable instruction sets, the present invention provides a method for programming a processor instruction set to include new instructions, and for replacing a critical code segment of a computer program with a function that causes the new instructions to execute. A programmable logic device (PLD) includes logic for enabling application-specific instructions ("instruction extensions") to be stored and executed, so that a user can add new instructions that change with software on different implementations of the same silicon. These instructions are not hard-wired into processor core, but rather implemented using the programmably configurable logic of the PLD.

The present invention provides in various embodiments a system and method for revising a program to allow the program to execute on a processor system that includes a programmable logic device. In a method according to an embodiment of the present invention, a program is compiled to produce an executable file and an instruction is programmed into a programmable logic device of the processor system. The method includes profiling a program to identify one or more critical code segments, rewriting a critical code segment as a function, designating the function as code to be compiled by an extension compiler, replacing the critical code segment with a statement that calls the function, and compiling the revised program.

In one embodiment, compiling the program includes compiling the code with an extension compiler to produce a header file and an intermediate file that provides instructions for the programmable logic device. In another embodiment, compiling the program includes using a standard compiler to compile the remainder of the program together with a header file to generate an executable file.

Further aspects of the inventive method include evaluating the performance of the revised program, and comparing the performance to timing requirements or to prior performance. In one embodiment of the method, the function replacing the critical code segment is selected from a library of pre-defined functions. In another embodiment, the program is written in a program file and the function includes writing the code to an extensions file.

In a further embodiment, the program is written in a program file and designating the function as code to be compiled by an extension compiler includes writing the code into the program file and demarking the code. In a still further embodiment, compiling the revised program includes compiling an extensions file including the code to produce a header file and an intermediate file written in a hardware description language, for example in Verilog HDL.

A further understanding of the nature and advantages of the inventions herein may be realized by reference to the remaining portions of the specification and the attached drawings.

DETAILED DESCRIPTION OF THE INVENTION

The present invention provides a method for programming a processor instruction set to include new, extended instructions and for replacing a critical code segment of a computer program with a function that causes the new instruction to execute. As general purpose processors typically do not have programmable instruction sets, the present invention will be described with reference to the programmable processing hardware of FIG. 1, though it will be appreciated that the invention is not so limited and can be used in conjunction with other suitable programmable processing hardware.

Figure 1:
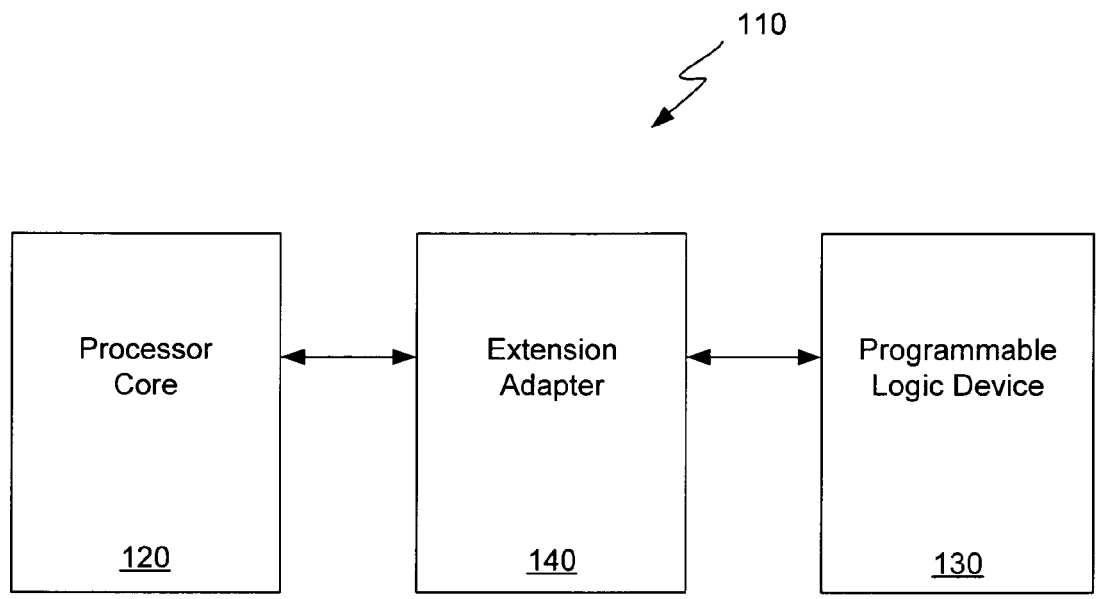
FIG. 1 is a schematic diagram of an exemplary extensible processor system of the present invention.

FIG. 1 is a schematic drawing of an exemplary programmable processing system 110 including a processor core 120, a programmable logic device (PLD) 130, and an extension adapter 140 that couples the programmable logic device 130 to the processor core 120. The processor core 120 can include optional features such as additional coprocessors, write buffers, exception handling features, debug handling features, read only memory (ROM), etc. The processor core 120 provides standard processing capabilities such as a standard (native) instruction set that provides a set of instructions that the processor core 120 is designed to recognize and execute. Typical instructions include arithmetic functions such as add, subtract, and multiply, as well as load instructions, store instructions, and so forth. These instructions are hard-coded into the silicon and cannot be modified. One example of a suitable processor core 120 is the Xtensa ® V (T1050) processor, from Tensilica, Inc., of Santa Clara, Calif.

Programmable logic device (PLD) 130 includes programmable logic for enabling application-specific instructions ("instruction extensions") to be stored and executed. Because it is programmable, the instruction set of programmable logic device 130 can be readily configured to include instruction extensions that are tailored to a specific application. In some embodiments the programmable logic device (PLD) 130 runs at a slower clock speed than processor core 120. In these embodiments the cycle length of the programmable logic device 130 can be a multiple of the clock cycle of the processor core 120.

Extension adapter 140 provides an interface between the programmable logic device 130 and the processor core 120. Extension adapter 140 receives instructions and determines whether the instructions should be directed to the programmable logic device 130 or the processor core 120. In some embodiments extension adapter 140 provides an interface between a plurality of programmable logic devices 130 and processor cores 120. Extension adapter 140 can be implemented, for example, in Application Specific Integrated Circuit (ASIC) logic.

Extension adapter 140 in combination with PLD 130 provide logic that allows users to extend the native instruction set defined by the processor core 120. It is noteworthy that the instruction execution itself is implemented in one or more of programmable logic devices 130. Extension adapter 140 interfaces one or more programmable logic devices 130 to processor core 120 and controls dataflow.

Figure 2:
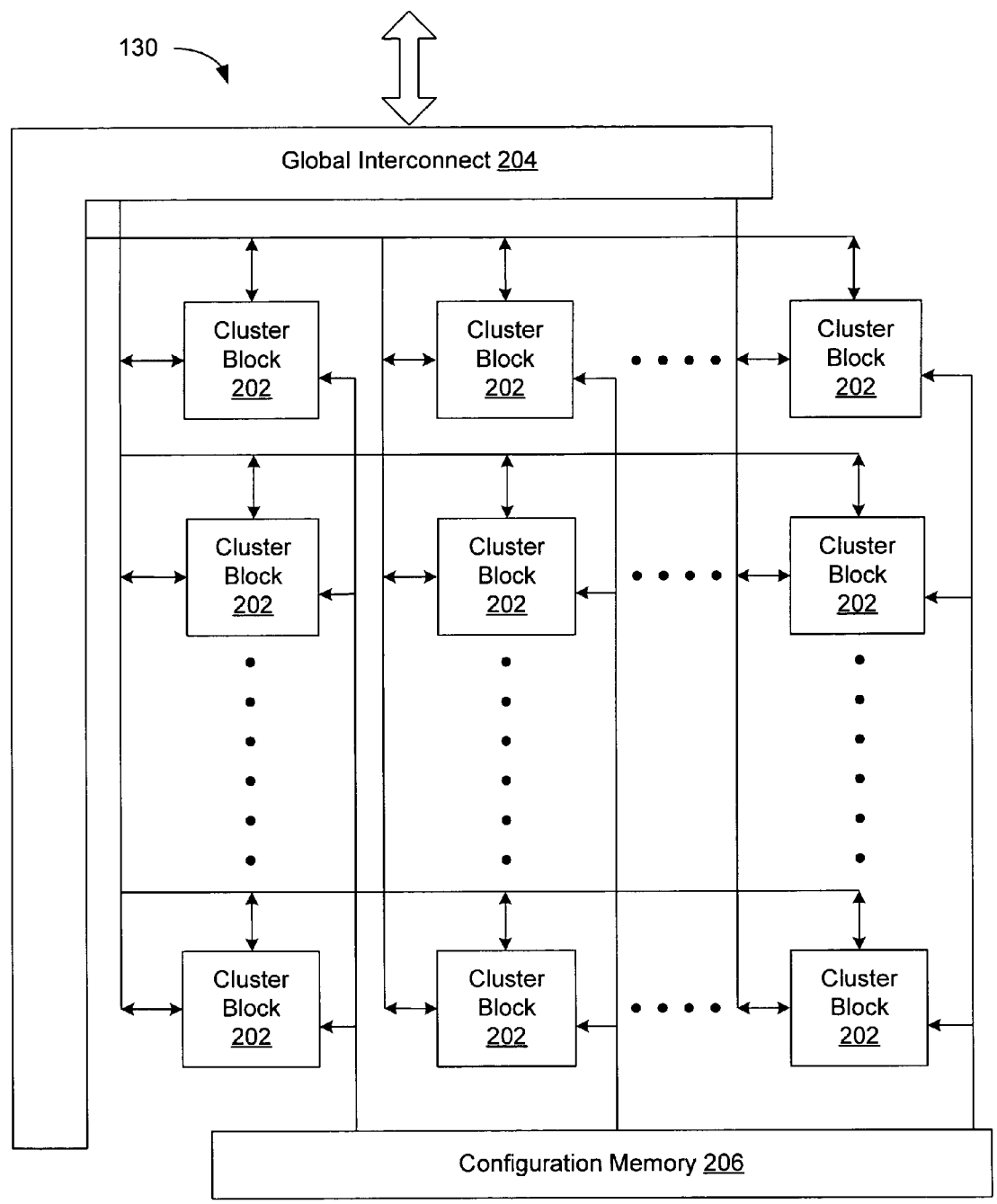
FIG. 2 is a schematic diagram of a programmable logic device (PLD) in accordance with the schematic of FIG. 1.

FIG. 2 illustrates one embodiment of a programmable logic device (PLD) 130. As shown, PLD 130 includes a plurality of cluster blocks 202 arranged in rows and columns. Data is communicated between cluster blocks 202 by means of a global interconnect 204. As shown, the global interconnect 204 also communicates data and dynamic configuration information used or output by PLD 130 with other devices including extension adapter 140, which data and dynamic configuration information will be described in more detail below. Although generically shown as permitting any two cluster blocks 202 in PLD 130 to communicate directly with each other via global interconnect 204, such interconnections need not be so limited. For example, cluster blocks 202 can additionally or alternatively have interconnections such that blocks in adjacent rows and/or columns communicate directly with each other.

Although not necessarily part of PLD 130, and preferably separately provided, also shown is configuration memory 206. Configuration memory 206 stores static configurations for PLD 130. The term "memory" is not intended to be construed as limiting. Rather, configuration memory 206 can have various implementations including CMOS static random access memory (SRAM), fused links and slow speed electrically erasable read only memory (EEPROM).

Figure 3:
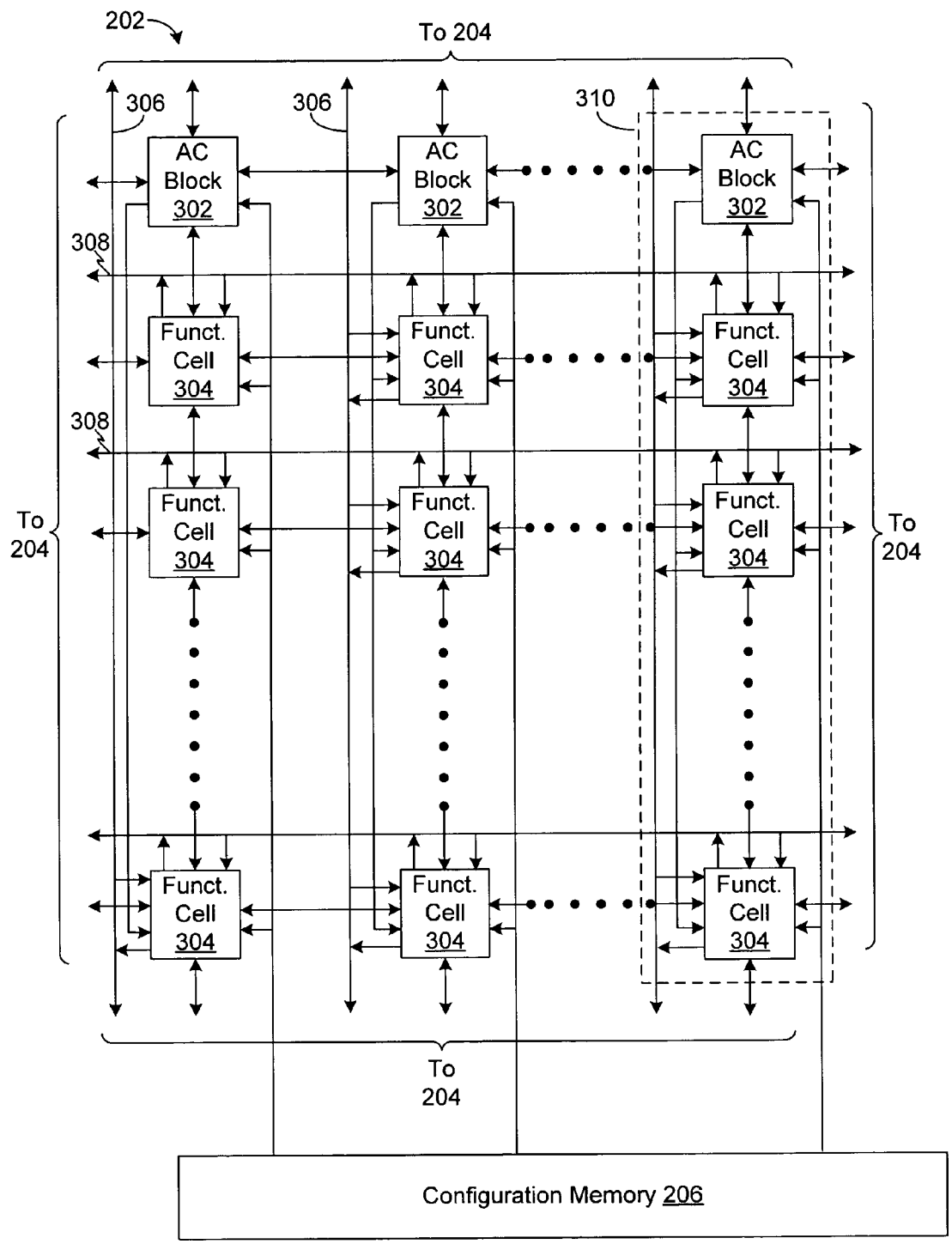
FIG. 3 illustrates an example of the cluster block implementation illustrated in FIG. 2.

FIG. 3 illustrates a cluster block arrangement that can be used to implement cluster block 202 in FIG. 2. As shown, it includes a plurality of ALU controller (AC) blocks 302 and function cells 304. The AC blocks 302 provide configuration signals for a respective column 310 of function cells 304. In one example of the invention, cluster block 202 includes four columns of four function cells 304, each column including one AC block 302.

FIG. 3 shows paths for sharing data and dynamic configuration information between vertically or horizontally adjacent function cells 304 within cluster block 202, and with other cluster blocks via global interconnect 204. Also shown are horizontal word lines 308 and vertical word lines 306, by which certain or all of the interior function cells 304 may communicate data with other cluster blocks 202, which word lines partially implement global interconnect 204.

Programmable logic device 130 is described in more detail in U.S. Patent Publication Number US 2001/0049816, which is incorporated herein by reference. A suitable programmable logic device 130 is available from Stretch, Inc., of Mountain View, Calif.

Figure 4:
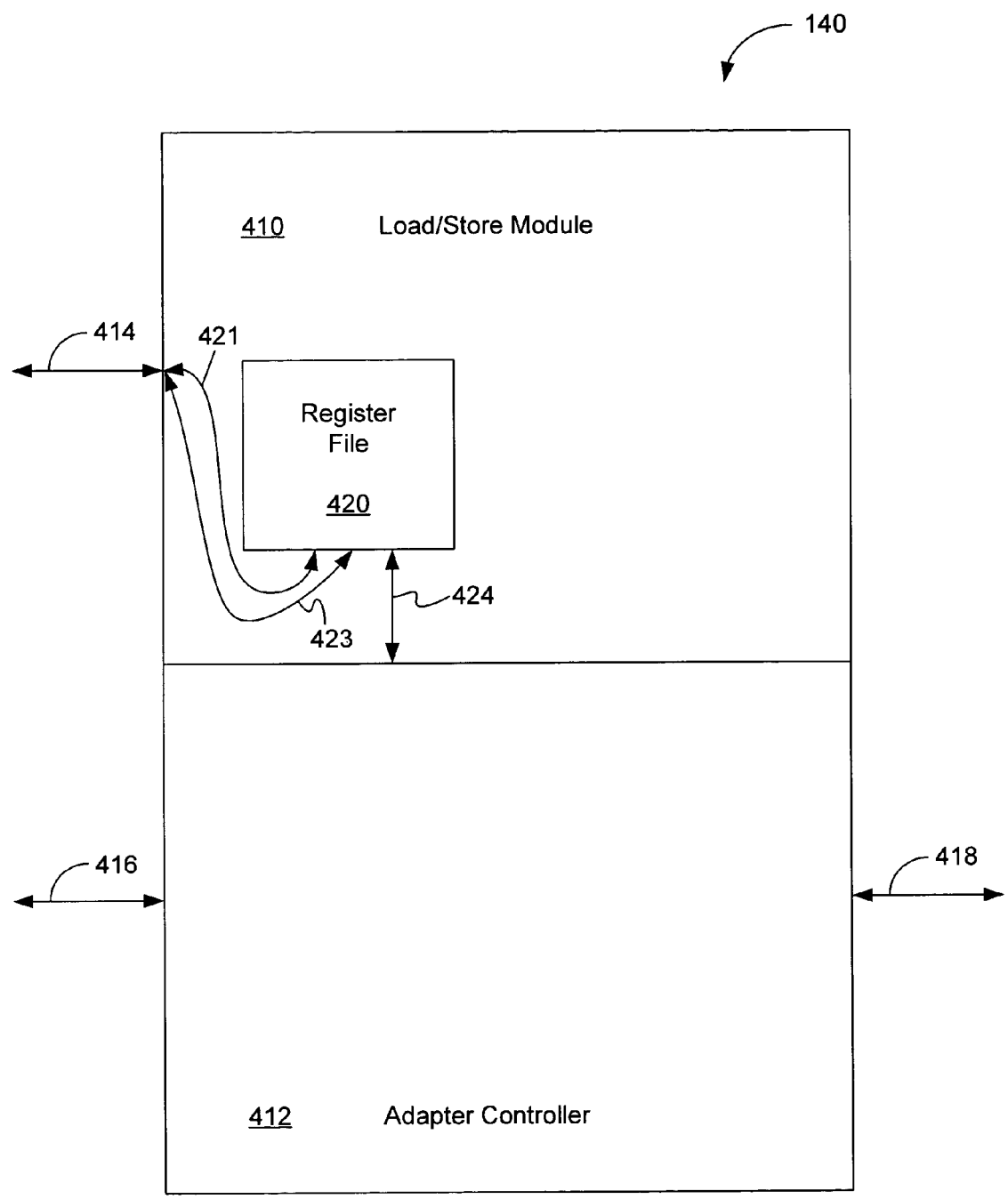
FIG. 4 is a schematic diagram illustrating details of the extension adapter of FIG. 1, in accordance with an embodiment of the present invention.

Referring to FIG. 4, extension adapter 140 is shown in greater detail. In one embodiment, extension adapter 140 comprises load/store module 410 and adapter controller 412. In another embodiment, processor core 120, and not extension adapter 140, comprises load/store module 410.

Load/store module 410 is created via a compiler, such as, for example, the Tensilica Instruction Extension (TIE) compiler, which can be obtained from Tensilica, Inc., of Santa Clara, Calif. TIE is a language that allows a user to describe the functionality of new extended instructions. A designer uses TIE to create a standard set of functions that extend the normal functionality of processor core 120. The TIE code that a designer writes describes the functionality of a series of resources that aid in the interface between processor core 120 and extension adapter 140. Users can therefore add new instructions pre-silicon. Extension adapter 140 functions such that processor core 120 treats user-defined post-silicon, extended instructions as if they were native instructions to the processor core 120.

Load/store module 410 interfaces with processor core 120 via interface 414. Register file 420 is coupled to interface 414 via processor control and data interface 421 and via PLD control and data interface 423. Adapter controller 412 interfaces with processor core 120 via interface 416. Adapter controller 412 interfaces with PLD 130 via interface 418.

In an exemplary embodiment according to the present invention, load/store module 410 comprises register file 420. Register file 420 is a register file, or collections of registers, that is added by using, for example, the TIE compiler. Register file 420 interfaces with adapter controller 412 via interface 424. In one embodiment, register file 420 is 128 bits wide. In another embodiment, register file 420 is 64 bits wide. However, register file 420 can be of varying widths. It is contemplated that the system can comprise one or more than one register file 420. Adapter controller 412 accesses register file 420. Adapter controller 412 is then used to interface with PLD 130.

Load/store module 410 provides fixed instruction functionality. A set of fixed instructions includes instructions for moving data to and from external memory (not shown), into and out of register file 420. This collection of functionality is defined in one embodiment in the TIE language, and is implemented through Tensilica's TIE compiler. It is contemplated that languages other than TIE can be used with the present system. Load/store module 410 contains one or more register files 420 and a set of fixed instructions that give register files 420 access to external memory via load and store instructions. Again, these instructions will be fixed once the silicon is created, and are fully implemented using the standard TIE flow. It is a function of the extension adapter 140 to encapsulate the fixed functionality and manage it with the configurable interface logic.

A purpose of load/store module 410 includes declaring the functionality of register file 420, which is basically temporary storage for data that is going to end up being transferred from processor core 120 to PLD 130. Load/store module 410 defines not only register file 420, but also defines how to load and store generic instructions (e.g., Tensilica instructions) of processor core 120 into register file 420. Adapter controller 412 performs the function of interfacing with register file 420. Adapter controller 412 also operates on the data from register file 420 and interfaces register file 420 with PLD 130.

In one exemplary methodology, standard load and store instructions are used to move data to and from register file 420. Load instructions issued by the extension adapter 140 retrieve data from memory into register file 420. PLD 130 instructions operate under the control of extension adapter 140 to retrieve stored data from register file 420 to PLD 130 for use in PLD 130 computations or other functional execution. Data resulting from PLD 130 instruction execution is then returned to register file 420, where store instructions move data from register file 420 to memory via interface 414.

PLD 130 and adapter controller 412 allow a user to add new instructions that change with software on different implementations of the same silicon. For example, a user can add specialized instructions to perform video or audio encoding/decoding. These instructions are not hard-wired into processor core 120, but rather are implemented using the programmably configurable logic of PLD 130. Extension adapter 140 operates as a data and control interface between processor core 120 and PLD 130 by routing extended instructions (i.e., those instructions not part of the original processor core 120 native instruction set) to PLD 130 for execution. Since the logic of PLD 130 is configurable, it is entirely within the scope of the present invention that the configuration of PLD 130 can be changed as frequently as needed to accommodate the inclusion of various extended instructions in application programs being run on the processor core 120.

In one embodiment of the present invention, the inputs and outputs to the extended instruction, as executed in PLD 130, are limited to data transfers between register file 420 or some equivalent special purpose register (processor states) location. In such an embodiment, the number of register file 420 inputs to the PLD 130 computation is limited to a finite number such as three (3), and the number of special purpose register inputs is eight (8) 128-bit registers. The outputs of the PLD 130 computations are directed to register file 420, to equivalent special purpose register, and/or by-passed to processor core 120 for use in execution of the subsequent instruction. In the above embodiment, the number of register file 420 outputs is two (2) and the number if 128-bit, special purpose register outputs is up to eight (8). The extended instruction of the present invention of such an embodiment does not have direct access to data and instruction memories and caches of the processor core 120. Any data residing in the data and instruction memories or caches of processor core 120 must first be brought into the register file 420 or equivalent special purpose registers using load instructions, before being used by the extended instruction as executed in PLD 130. Such a restriction in the I/O of the extended instruction of this embodiment enables compiler optimization and improved performance. The exact input and output dependencies of the extended instructions are programmed into the C compiler (discussed with reference to FIG. 7) used in scheduling the extended instruction and in allocating the associated register files 420.

It is noteworthy that extension adapter 140 handles the multiplexing of data among register file(s) 420 and PLD 130. Extension adapter 140 manages the timing relationships between register reads and register writes, which are functions of instruction execution length.

It is also noteworthy that the processing system 110 comprises means for ensuring the proper configuration of PLD 130 prior to the execution of a specific extended instruction in the PLD 130. In one example, if the system tries to execute an instruction not included in the instruction set of processor core 120 that has yet to be configured in PLD 130, an exception is generated by the extension adapter 140, resulting in either the proper configuration signals being sent to PLD 130, or in an alternative process, being initiated to deal with the missing configuration.

Figure 5:
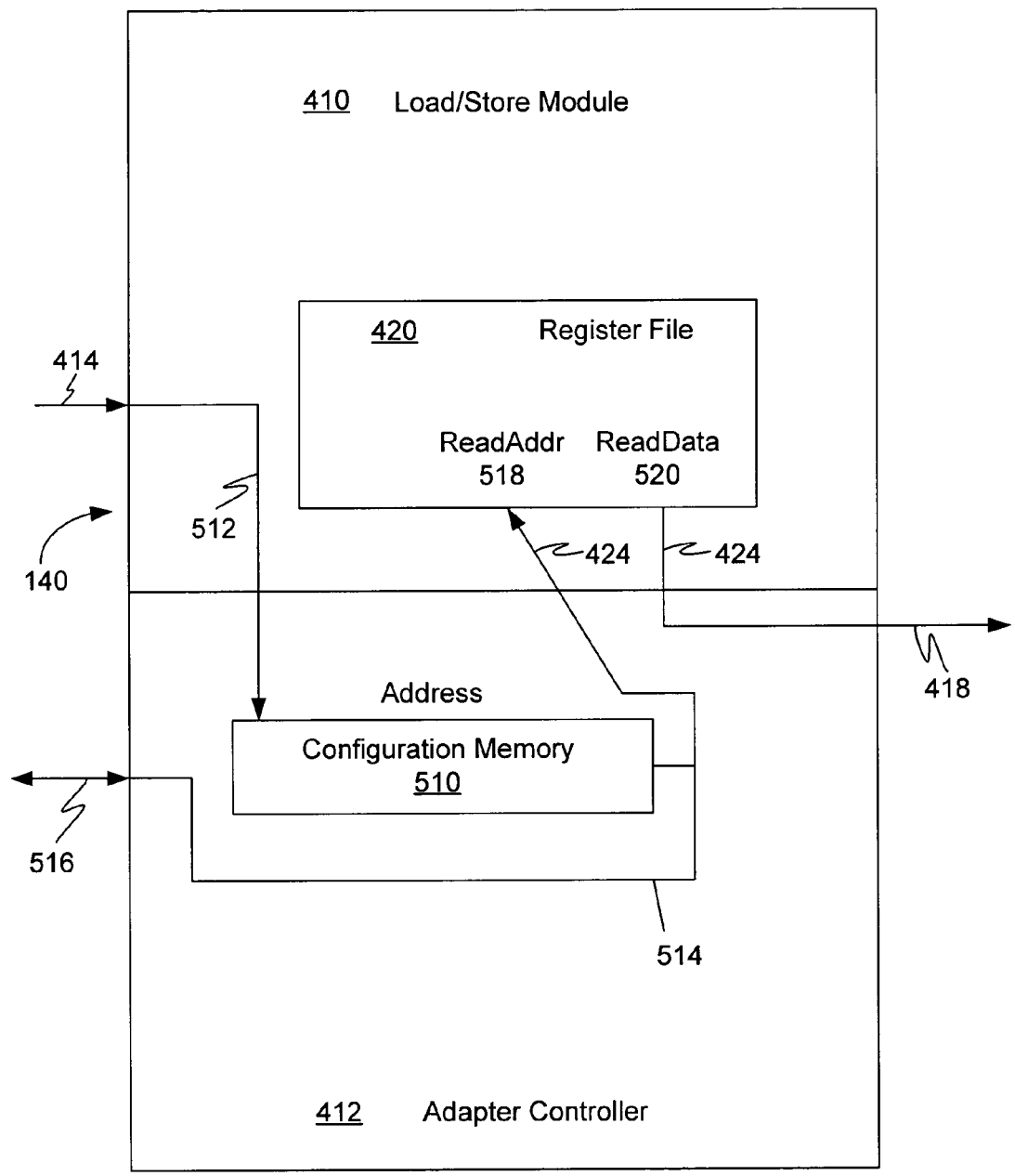
FIG. 5 is a schematic diagram illustrating an operation involving the reading of data in accordance with the extension adapter of FIG. 4.

In keeping with some embodiments according to the present invention, FIG. 5 illustrates an operation involving the reading of data. Configuration memory 510 has a description of what user instructions are adapted to do with respect to the interface to processor core 120. For any instruction that a user creates, those instructions should control processor core 120 in such a way that processor core 120 executes those instructions in similar fashion to native instructions included in the original processor core 120 instruction set. Configuration memory 510 receives instruction description data 512 (from interface 414 of FIG. 4) as a sequence of binary numbers (e.g., a 24-bit sequence) that is decoded by configuration memory 510 and converted into an address that points to a location in configuration memory 510.

If the instruction description data 512 describes a normal add, subtract, etc. contained in the native instruction set of processor core 120, then configuration memory 510 does not do anything with the instruction. However, if the instruction description data 512 describes an extended instruction that PLD 130 is to execute, then configuration memory 510 returns configuration information 514 back to processor core 120 to indicate this is a valid instruction. Extension adapter 140 will thereafter operate on the extended instruction in cooperation with PLD 130 so that to processor core 120 it appears that the extended instruction is identical in form to a native instruction of processor core 120.

Configuration information 514 is a sequence of data from configuration memory 510, some of which goes to processor core 120 via interface 516. Some of configuration information 514 is transmitted to the ReadAddr 518 (read address) input of register file 420 via interface 424. Data from ReadData 520 (read data) of register file 220 is also carried on interface 424. In this example, configuration information 514 includes the address within register file 420 that an extended instruction needs to be sent to PLD 130 via interface 418.

Figure 6:
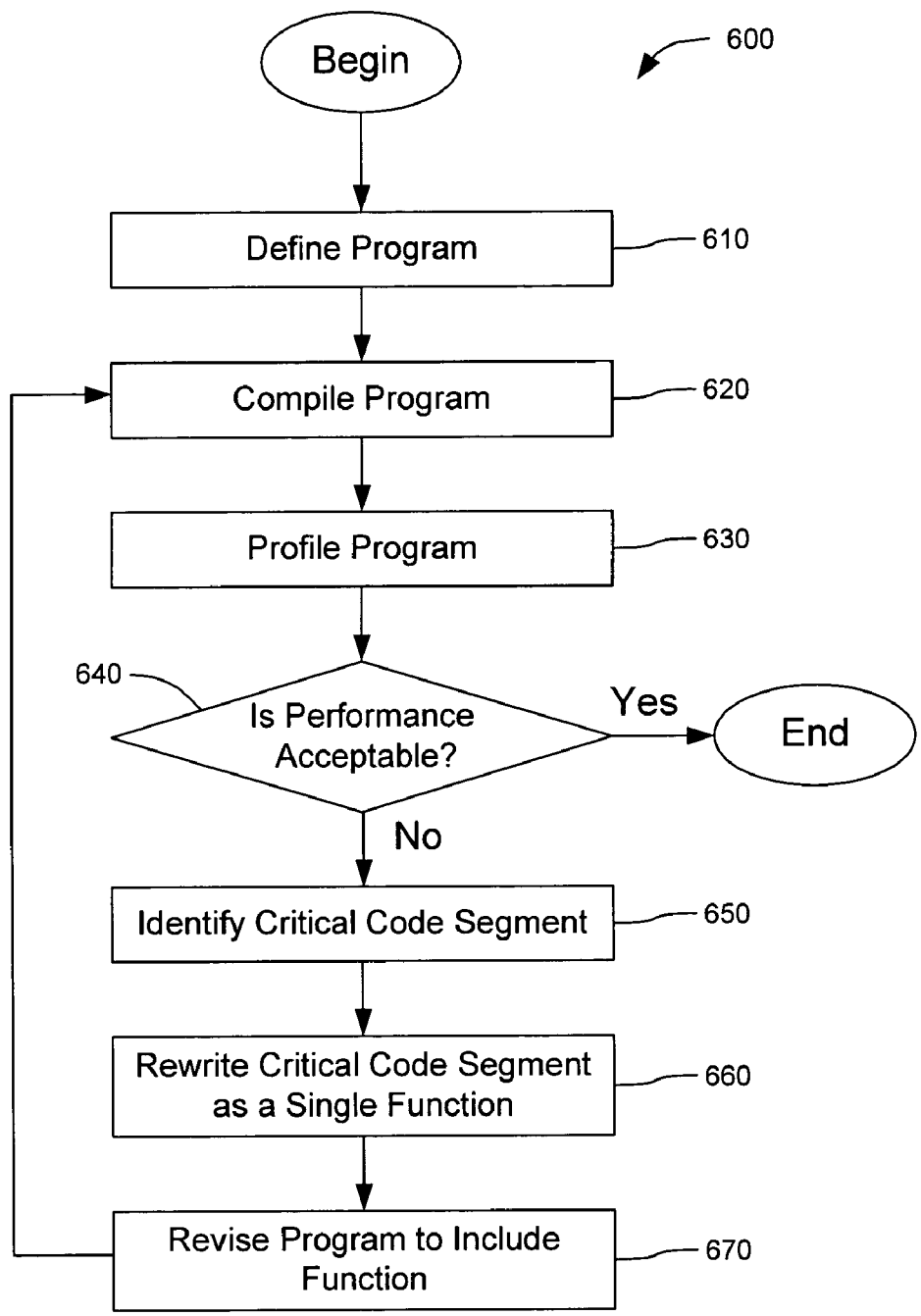
FIG. 6 is a flow chart illustrating a preferred method of the present invention.

FIG. 6 is a flow chart illustrating an exemplary embodiment 600 of the method of the invention. The method begins by defining a program in step 610. The program can be defined in a standard programming language that is familiar to computer programmers such as C++.

Thereafter, in step 620, the program is compiled to convert the program from the programming language in which it was written into a machine language that is recognizable by the processor core 120 (FIG. 1). It will be appreciated that the present method is intended to be iterative, as can be seen from FIG. 6, and that successive iterations initially return to step 620. Whereas in the first pass through step 620 a standard compiler, such as a C++ compiler, compiles the program, in successive iterations an additional extension compiler is also employed, as is discussed elsewhere herein.

Next, in step 630 the compiled program is profiled. Profiling includes executing the compiled program and determining how much time would be expended executing each of the various operations of the program. Profiling in step 630 is preferably performed using a software simulation tool (not shown) that mimics the operation of the processor core 120. Such processor simulators are well known in the art, and each simulator is unique to the processor core 120 being simulated. Alternatively, profiling 630 can occur using a hardware emulator (not shown) or some combination of hardware and software. Hardware emulation is particularly useful in applications where specific timing issues are of concern to the designer.

As in step 620, because the method is iterative, the first pass through step 630 is different than in successive iterations. In the first pass through step 630 the compiled program is executed or simulated solely on the processor core 120 to provide a baseline against which improvements in successive iterations can be measured. It should be noted that some of the more time consuming operations that are typically identified by profiling involve nested loops.

In step 640 a determination is made as to the acceptability of the performance of the program. If the performance is acceptable then the method ends. Otherwise, the method continues to step 650. Generally, in the first pass through step 640 the performance will not be acceptable since no effort has yet been made to optimize the program. In successive iterations, performance can be judged against either subjective or objective standards. In some instances the program needs to be optimized so that it can return data according to the timing requirements of other programs with which it interfaces. In other instances merely a faster processing speed is desired from the program. In these latter instances, at each iteration the performance is compared to the performance from the prior iteration to determine whether the most recent iteration returned a further improvement. If no further improvement is achieved by a successive iteration, or if the improvement is sufficiently trivial, the performance is deemed to be acceptable and the method ends.

In step 650 one or more critical code segments are identified by reviewing the results of the profiling performed in step 630. A critical code segment is a portion of the program's code that took excessive time to execute in step 630. Typically, those code segments that took the longest time to execute are considered to be the most critical and are addressed first by the method. As noted elsewhere, nested loops are frequently identified as critical code segments. If addressing the most critical code segments does not produce acceptable performance in step 640, then in successive iterations the next most critical code segments are identified in step 650.

Next, in step 660, the critical code segment identified in step 650 is preferably rewritten as a separate function. An example is illustrative of this process. The following original code segment written in C++ includes a nested loop as the critical code segment:

```
a = 0
for (i = 0; i < 100; i ++)
    {for (j = 0; j < 8; j ++)
        {a + = x[i + j] * y[j];}
    z[i] = a >> k;}
```

The critical code segment can be rewritten as a function, which in the following example is given the name "inner":

```
int inner (short*x, short*y)
    {for (j = 0; j < 8; j ++)
        {a + = x[j] * y[j];}
    return a >> k;}
```

Advantageously, the function can be written using the same programming language as before. In some embodiments the function does not have to be written from scratch but can instead be selected from a class library (not shown) of pre-defined functions. A class library of pre-defined functions can include functions that might be particularly useful in a certain type of application, such as functions for working with pixel data in video processing applications.

In an alternative embodiment, step 660 markers (in C programming, such markers are conventionally referred to as PRAGMAS) are used to demark the beginning and ending of a section of code to be rewritten. Once identified, the demarked section of code is replaced by one, or alternatively, multiple instructions. It should be apparent to those of ordinary skill in the art that the rewriting step of 660 can be performed either manually, or by using an automated conversion tool. Such a conversion tool would be similar to a decompiler; rather than compiling a high level instruction into multiple lower level instructions as in a compiler, the automated conversion tool would convert multiple lower level instructions of the processor core 120 instruction set into one or more complex extended instructions for implementation in PLD 130.

Once the critical code segment has been rewritten as a function in step 660, in step 670 the program is revised. The revision includes two operations, designating the function as a code segment to be compiled by an extension compiler and replacing the critical code segment with a statement that calls the function. In some embodiments the function is placed into an extensions file, separate from the program file, that contains the code meant to be compiled by the extension compiler. In other embodiments the function is placed in the program file and demarked in such a way that it can be recognized as intended for the extension compiler so that the standard compiler will ignore it. Demarking the function in this way can be achieved by a flag before the instruction (e.g., # pragma stretch begin) and a flag after the function (e.g., # pragma stretch end).

As noted, revising the program also includes replacing the critical code segment with a statement that calls the function. Continuing with the prior example, the original code segment that includes the critical code segment can be rewritten by replacing the critical code segment with the statement {z[i]=inner (x +i, y);} as follows:

```
a = 0
for (i = 0; i < 100; i ++)
    {z[i] = inner (x + i, y);}
```

Once the program has been revised in step 670 the method returns to step 620 and the program is again compiled. In those embodiments in which the function has been placed in the program file and demarked from the remaining code, a pre-processing tool first finds the function and copies it out to an extensions file.

Figure 7:
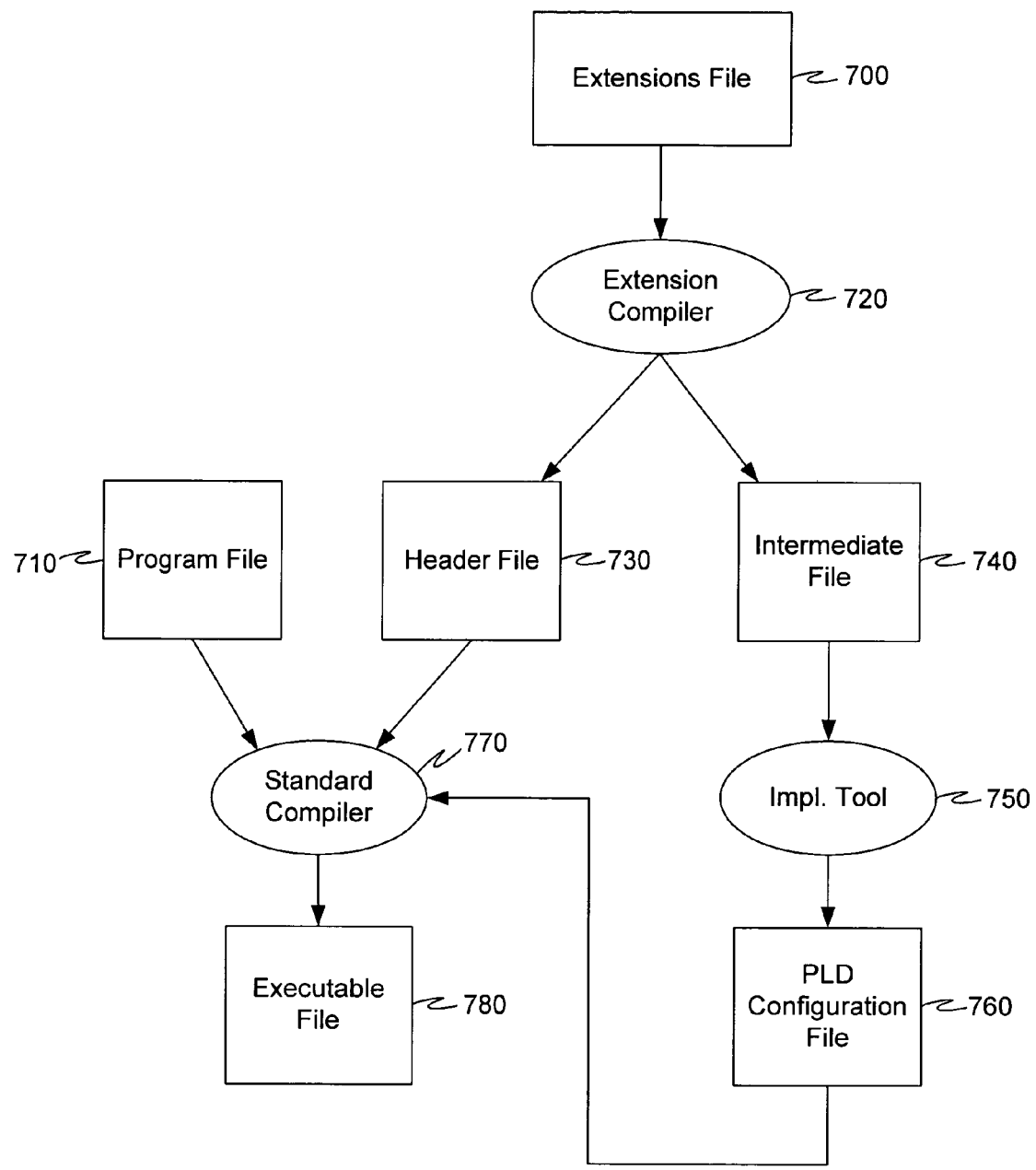
FIG. 7 is a flow chart further detailing the method of the invention illustrated in FIG. 6.

FIG. 7 illustrates an exemplary sequence of events that occurs during step 620 to compile an extensions file 700 and a program file 710. Initially, the code in the extensions file 700 is compiled by the extension compiler 720. An example of an extension compiler 720 is Stretch C, available from Stretch, Inc. of Mountain View, Calif. The extension compiler 720 produces two outputs: a header file 730 and an intermediate file 740 written in a hardware description language such as Verilog HDL. The header file 730 declares a prototype for a specific function used to execute an extended instruction called out by the extension compiler 720 during compilation of the extensions file 700. The header file 730 is a conventional C file that provides instruction information, such as the file name, inputs required, outputs written, and other required instruction parameters. The intermediate file 740 describes how to implement an instruction in the programmable logic device 130 (FIG. 1) that corresponds to the function. Next, an implementation tool 750 maps the intermediate file 740 to the programmable logic device 130. More specifically, the implementation tool 750 converts the contents of the intermediate file 740 to PLD configuration file 760. Implementation tool 750 generates PLD configuration file 760 consisting of a bit stream that is compiled with program file 710 and header file 730 in standard compiler 770 and incorporated in the executable file 780. This PLD configuration file 760 contains the data that is used by the executable file 780 to configure PLD 130 in much the same way that a Field Programmable Gate Array (FPGA) is programmed.

When the extension adapter 140 encounters a processor core 120 instruction that is not part of the native set, but is rather an extended instruction generated by extension compiler 720, the processor core 120 sends a configuration bit stream to the PLD 130 to appropriately configure the PLD 130 to execute the extended instruction. Thus, the executable file 780 can call the function and the programmable logic device 130 contains an instruction that can perform the function.

Thereafter, in step 630 the program is again profiled. In this and subsequent iterations of the method, in contrast to the first pass through step 630, the extension adapter 140 (FIG. 1) directs the programmable logic device 130 to execute the instruction corresponding to the function when the function is called as the executable file 780 runs. Accordingly, the program executes more efficiently, as will be represented by the profile. Next, in step 640 the performance is again evaluated, and if acceptable the method ends, otherwise it begins a new iteration at step 650.

Returning to step 660, a critical code segment can alternatively be rewritten by selecting a pre-defined function from a class library. The following example is illustrative of pre-defined functions that might be found in a class library according to an embodiment of the present invention, and of an instruction that would be defined from these functions. Typical graphics applications define a pixel by an 8-bit integer for each of three colors such as red, green, and blue. According to the present invention, a class library for graphics applications can include a pre-defined function for red, for example, that defines an unsigned 8-bit declared integer, R, by the function se_uint<8>R; and another pre-defined function would define for the pixel an unsigned 24-bit declared integer, P, by the function se_uint<24>P=(B, G, R); where B and G correspond to blue and green, respectively. In the C++ programming language integers are generally limited to standard bit lengths such as 8, 16, 32 and 64. Accordingly, the ability to create a 24-bit integer, or any integer with a non-standard number of bits, is a beneficial feature of the present invention. Without the ability to define a pixel as a 24-bit integer, one would have to define the pixel as a 32-bit integer, but at the expense of having to carry 8 unused bits.

The advantage of not having to carry unused bits can be further seen when a number of pixels are assigned to a register with a pre-defined width. For instance, a register, W, that has a 128-bit width can accommodate four 32-bit pixels, but the same register can handle five 24-bit pixels. Expressed as an instruction for a programmable logic device 130, assigning five 24-bit pixels to register W would be expressed as WR W=(P4, P3, P2, P1, P0).

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. Accordingly, the specification and drawings are to be regarded as illustrative rather than restrictive.

The invention claimed is:

1. A method for modifying a program to allow the program to execute on a processor system that includes a programmable logic device, the method comprising:
   identifying a critical code segment of the program;
   rewriting the critical code segment as a function;
   revising the program by designating the function as a code to be compiled by an extension compiler and by replacing the critical code segment with a statement that calls the function; and
   compiling the revised program, including compiling an extensions file including the code to produce a header file, and an intermediate file written in a hardware description language, such that the function is executed by the programmable logic device.

2. The method of claim 1 wherein the critical code segment is defined by a length of time required for execution.

3. The method of claim 1 wherein the critical code segment is a nested loop.

4. The method of claim 1 wherein the program is written in a programming language and the function is written with the same programming language.

5. The method of claim 1 wherein the function is selected from a library of pre-defined functions.

6. The method of claim 1 wherein the function defines an integer with a non-standard number of bits.

7. The method of claim 1 wherein the program is written in a program file and designating the function as a code includes writing the code to an extensions file.

8. The method of claim 1 wherein compiling the revised program includes copying the code to an extensions file.

9. The method of claim 1 wherein the step of revising is performed manually.

10. The method of claim 1 wherein the step of revising is performed using an automated conversion tool.

11. The method of claim 1 wherein the hardware description language is Verilog HDL hardware description language.

12. The method of claim 1 wherein the header file declares a prototype for the function.

13. The method of claim 1 wherein the intermediate file includes an implementation of the function as an instruction for a programmable logic device.

14. The method of claim 9 wherein the header file and the revised program are compiled together by a standard compiler to generate an executable file.

15. The method of claim 14 wherein the standard compiler also includes the compiling of a configuration file in generating the executable file.

16. The method of claim 1 further comprising:
profiling the revised program; and
evaluating the performance of the revised program.

17. The method of claim 16 wherein evaluating the performance of the revised program includes comparing the performance against a timing requirement.

18. The method of claim 16 wherein evaluating the performance of the revised program includes comparing the performance against a prior performance.

19. The method of claim 1 wherein the function executed by the programmable logic device does not have direct access to non-register file memory.

20. The method of claim 1 wherein the function executed by the programmable logic device has register file inputs and outputs limited to a predetermined number set by the compiler.

21. The method of claim 20 wherein the limited predetermined number of register file inputs is three.

22. A method for extending the native instruction set of a general purpose processor in a computing system comprising the general purpose processor and a programmable logic device, the method consisting of the steps of:
(i) identifying critical code segments in an application program to be run on the computing system;
(ii) replacing the critical code segments with at least one extended instruction, not included in the native instruction set of the general purpose processor;
(iii) compiling the application program including the critical code segments containing the extended instruction, including compiling an extensions file including a code containing the extended instruction to produce a header file, and an intermediate file written in a hardware description language; and
(iv) executing the compiled application program on the computing system such that the native instructions are executed by the general purpose processor and the extended instruction is executed by the programmable logic device.

23. The method of claim 22 wherein the critical code segment is defined by a length of time required for execution.

24. The method of claim 22 wherein the critical code segment is a nested loop.

25. The method of claim 22 wherein the at least one extended instruction is selected from a library of predefined extended instructions.

26. The method of claim 22 wherein compiling the application program includes copying the application program to an extensions file.

27. The method of claim 22 wherein the hardware description language is Verilog HDL hardware description language.

28. The method of claim 22 wherein the step of revising is performed manually.

29. The method of claim 22 wherein the step of revising is performed using an automated conversion tool.

30. A system for modifying a program to allow the program to execute on a processor system that includes a programmable logic device, comprising:
means for identifying a critical code segment of the program;
means for rewriting the critical code segment as a function;
means for revising the program by designating the function as a code to be compiled by an extension compiler and by replacing the critical code segment with a statement that calls the function;
means for compiling the revised program, including means for compiling an extensions file including the code to produce a header file, and an intermediate file written in a hardware description language; and
means for storing instruction extensions such that the function is executed by the programmable logic device.

31. The system of claim 30 wherein the critical code segment is defined by a length of time required for execution.

32. The system of claim 30 wherein the critical code segment is a nested loop.

33. The system of claim 30 wherein the program is written in a programming language and the function is written with the same programming language.

34. The system of claim 30 wherein the function is selected from a library of pre-defined functions.

35. The system of claim 30 wherein the function defines an integer with a non-standard number of bits.

36. The system of claim 30 wherein the program is written in a program file and means for revising the program by designating the function as a code includes means for writing the code to an extensions file.

37. The system of claim 30 wherein the program is written in a program file and means for revising the program by designating the function as a code includes means for writing the code into the program file and demarking the code.

38. The system of claim 30 wherein means for compiling the revised program includes means for copying the code to an extensions file.

39. The system of claim 30 wherein the hardware description language is Verilog HDL hardware description language.

40. The system of claim 30 wherein the header file declares a prototype for the function.

41. The system of claim 30 wherein the intermediate file includes an implementation of the function as an instruction for a programmable logic device.

42. The system of claim 30 wherein the header file and the revised program are compiled together by a standard compiler to generate an executable file.

43. The system of claim 30 further comprising:
means for profiling the revised program; and means for evaluating the performance of the revised program.

44. The system of claim 43 wherein the means for evaluating the performance of the revised program includes means for comparing the performance against a timing requirement.

45. The system of claim 43 wherein the means for evaluating the performance of the revised program includes means for comparing the performance against a prior performance.

46. The system of claim 30 wherein the function executed by the programmable logic device does not have direct access to non-register file memory.

47. The system of claim 30 wherein the function executed by the programmable logic device has register file inputs and outputs limited to a predetermined number set by the compiler.

48. The system of claim 30 wherein the limited predetermined number of register file inputs is three.

49. A method for modifying a program to allow the program to execute on a processor system that includes a programmable logic device, the method comprising:

identifying a critical code segment of the program;

demarking the critical code segment;

revising the program by designating the demarked code segment as a code to be compiled by an extension compiler and by replacing the critical code segment with one or more extended instructions; and compiling the revised program, including compiling an extensions file including the code to produce a header file, and an intermediate file written in a hardware description language, such that the extended instructions are executed by the programmable logic device.

* * * * *